United States Patent [19]

Frieder

[11] Patent Number: 4,867,553

[45] Date of Patent: Sep. 19, 1989

[54] FINISHED COMPOSITE EYEGLASS LENS

[76] Inventor: Philip M. Frieder, 6376 SW. 10th Ter., Miami, Fla. 33144

[21] Appl. No.: 31,839

[22] Filed: Mar. 30, 1987

[51] Int. Cl.$^4$ .......................... G02C 7/06; G02C 7/02
[52] U.S. Cl. .................................. 351/172; 350/417; 351/159
[58] Field of Search ................................ 351/168–172, 351/159; 350/417

[56] References Cited

U.S. PATENT DOCUMENTS

| | | | |
|---|---|---|---|
| 805,438 | 11/1905 | Bell | 351/172 |
| 2,092,789 | 9/1937 | Tillyer | 350/417 |
| 4,645,317 | 2/1987 | Frieder et al. | 351/168 X |
| 4,679,918 | 7/1987 | Ace | 351/159 X |

FOREIGN PATENT DOCUMENTS 52-10742  1/1977  Japan .................................. 351/168

Primary Examiner—Scott J. Sugarman
Attorney, Agent, or Firm—Bachman & LaPointe

[57] ABSTRACT

A combination of a first inner single vision prescription lens component with a select diopter correction and a second outer lens component having a range of diopter values from −0.25 to −2.0 and +0.5 to +2.0, with a minus opthalmic adhesive optically and physically bonding together the anterior surface of the first lens with the posterior surface of the second lens.

7 Claims, 1 Drawing Sheet

FINISHED COMPOSITE EYEGLASS LENS

BACKGROUND OF THE INVENTION

The present invention relates to the assembling of spectacle lenses by eyecare professionals which previously have been ground to order by wholesale laboratories. This new system allows retailers to give "while you wait" service and has particular utility when multi-focal segments, progressive or blended additions, abrasion resistant coatings, anti-reflection coatings, asphericity, photochromics or other tints, polaroid filters, or other features are needed in addition to standard single vision focussing power.

Eyecare professional retailers including opticians, optometrists and ophthalmologists often carry an inventory of finished single vision prescription lenses in-house. They are able to deliver about 30% of their patient's orders from inventory by selecting the appropriate lens and edging them into the selected frames chosen by individual patients.

The remainder of their orders are sent to wholesale grinding labs for processing. Wholesale lab grinding is necessary because many prescriptions require features beyond single vision focussing power that make inventorying them impractical and too expensive. Because the number of individual permutations is nearly infinite, wholesale grinding labs carry an inventory of semi-finished blanks in a sufficient variety to cover most orders. Each category of semi-finished blank covers a huge variety of individual prescription possibilities.

The problems with this state of the art are varied. Individually ground prescription lenses are subject to variations in power, thickness and optical center location because of the complex process needed. The state of the art does not allow all lenses to be finished with exact or often tolerable specifications. This same complex process is expensive, cost inefficient and creates delays in delivery usually from 3 days to 2 weeks. In addition patient pressure for delivery often forces retailers to dispense eyeglasses that are less than optimum with respect to their specifications. This often causes eye strain, headaches, and partial loss of visual function.

Typical prior art patents include U.S. Pat. Nos. 993,812; 1,267,014; 1,304,421; 1,948,636; 2,033,101; 2,330,663; 2,611,294; 3,248,460; 3,617,116; 3,628,854; 3,702,218; 3,771,858; 3,904,281; and 3,917,766.

It would, therefore, be highly desirable to provide the spectacle retailer with lens covers which carry the particular bifocal, trifocal, special vocational or aspheric correction required by that particular patient. Prior art necessitated the use of a grinding laboratory because it would be impossible to carry in stock all the possible combinations of prescriptions, in addition to all the possible bifocal, trifocal, special vocational or aspheric locations resulting from each patient's particular facial and ocular measurements.

Attempts have been made to respond to this problem by providing composite lenses as represented by the following patents: U.S. Pat. No. 4,547,049; U.S. Pat. No. 4,576,623; U.S. Pat. No. 4,645,317; U.S. Pat. No. 3,877,798; and Japan 552-10742. However, these have not been entirely successful for a variety of reasons including the difficulty of forming the composites use of expensive equipment, inconvenience, high cost and the limited efficacy thereof.

Accordingly, it is a principal object of the present invention to provide eyecare professionals with a new system which allows the simple, convenient and expeditious assembly of spectacle lenses previously ground to order.

It is a still further object of the present invention to provide a combination eyeglass lenses as aforesaid which will allow eyeglass retailers to readily provide "while you wait" service for a wide variety of prescriptions, including multi-focal segments, progressive or blended additions, abrasion resistant coatings, anti-reflection coatings, asphericity, photochromics or other tints, polaroid filters, or other features needed in addition to standard, single vision focussing power.

A further object of the present invention is to provide the eyeglass retailer with very inexpensive lens overlays which can be combined with his own in-house stock single vision lenses to create a simply prepared, large inventory of spectacle lenses at a reasonable cost.

A further object of this invention is to provide the patient with prompt delivery and fitting of their prescription eyeglasses even when complex additions are involved, and at a substantially reduced cost because all the fabrication can be done on the premises of the eyeglass retailer.

Further objects and advantages of the present invention will appear hereinbelow.

SUMMARY OF THE INVENTION

Accordingly, in view of the present invention it has now been found that the foregoing objects and advantages of the present invention may be readily obtained.

The eyeglass lens of the present invention comprises in combination a first inner single vision prescription lens component with a selected diopter correction and having a curved anterior surface and a curved posterior surface, a second outer lens component having a range of diopter values from $-0.25$ to $-2.0$ and from $+0.50$ to $+2.0$ diopters and having a curved anterior surface and a curved posterior surface, preferably with the curved anterior surface of the first lens being $+0.07$ to $+0.12$ diopters steeper than the curved posterior surface of the second lens, a minus ophthalmic adhesive optically and physically bonding together the anterior surface of the first lens with the posterior surface of the second lens, whereby upon pre-selecting the first and the second lens components, the two can be optically and physically joined from a modular supply of both types of lenses. The thickness of the edge and center of the second lens component differ by a factor of at least 1.5 and preferably at least two, which lends stability to the second outer lens component. It is preferred that the second lens component have a diopter value of about $-0.50$. The second lens component can include a bifocal or multi-focal addition in a portion of its area as well as many other types of desired additive features.

The foregoing construction readily and conveniently achieves the foregoing objectives. It is simple and inexpensive to construct by a retailer on an "as you wait" basis. The minus lens adhesive configuration is especially advantageous as it allows the adhesive to flow evenly out to the edges without assistance. This creates an optically inert lamination which avoids problems with the optics of a laminated sandwich.

The construction of the present invention avoids the problems encountered with a plano cover lens. The cover lens of the present invention is easy to handle and does not create wavy surfaces. The flexibility of a thin, plano cover lens often creates wavy and distorted optics. Thus, for example, a −0.50 D. cover lens, having a diameter of 75 mm has an edge thickness of 1.7 mm as compared to 1.0 mm in the center. This gives the lens the needed stability and also makes it easier for semi-skilled or even non-skilled retailers to accurately handle during lamination.

Further advantages of the present invention will appear herein.

BRIEF DESCRIPTION OF THE DRAWINGS

The present invention will be more readily apparent from a consideration of the following description and accompanying drawings which represent illustrative embodiments wherein.

DETAILED DESCRIPTION

Figure 3:
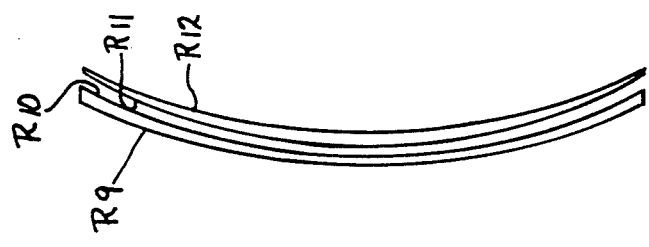
FIGS. 2 and 3 are alternate embodiments of eyeglass lens combinations in accordance with the present invention.

The present invention involves the lamination of a cover lens having a defined diopter value range, and preferably a −0.50 diopter cover lens, as the vehicle to deliver the extra features beyond single vision focusing power to the final prescription. The cover lens is laminated to the anterior surface of the single vision lens using a quick curing ultra-violet adhesive which can be readily done by the retailer or a wholesale lab. The −0.50 cover lens can, for example, be used to deliver:
1. Bifocals having any shape or style.
2. Trifocals having any shape or style.
3. Vocational segments having any shape or style.
4. Abrasion resistant coatings.
5. Anti-reflection coatings.
6. Polaroid filters.
7. Photochromic and other tints.
8. Asphericity for high powered prescriptions.
9. Progressive and blended additions.

The ultra-violet adhesives are preferred. These have a similar index of refraction as the lens material so that it becomes optically inert with respect to the finished laminate lens. Known materials can be readily utilized for this purpose and include those adhesives which will both suitably transmit light and provide the desired adhesive properties to maintain the lenses in a laminated condition. Typical materials include one or two-part curing adhesives, based on epoxy, acrylic, polyurethane or silicone resins.

The present invention will be more readily understandable from a consideration of the following illustrative examples.

EXAMPLE 1

$Rx = +1.00 + 0.50 \times 90$

Add +2.00 Flat top Bifocal

Step #1. Transpose the distance prescription to minus cylinder form, i.e. $+1.50 - 50 \times 180$ Step #2. Add +0.50 D. to the spherical power of the Rx to compensate for the effect of the −0.50 D. cover lens, i.e. $+2.00 - 0.50 \times 180$ Step #3. Select a +2.00−0.50 single vision lens from stock. Clean the lens using a low lint paper wipe and wipe with water. The purpose is to thoroughly remove major dirt marks from the lens and wet the two surfaces.

Then spray another low lint paper wipe with acetone and go over the entire lens to remove any grease and to dry the surfaces by the action of the acetone which absorbs the water.

Step #4. Position the single vision lens in the lensometer and spot with respect to axis and optical center location.

Step #5. Super-impose three dots on the posterior surface of the lens using the three lensometer-made dots as a reference. Re-clean the anterior surface using first water and then acetone.

Step #6. Select a +2.00 add −0.50 D. cover lens which is designated for a distance single vision lens of +1.50 D. This assures that the two lens components will have compatible mated lamination curves. Clean the −0.50 D. cover lens using the same technique as in Step #3.

Step #7. Position the −0.50 D. cover lens atop a flat low lint wipe on a work area with the concave or posterior surface up. Drop 10 drops of adhesive in the center of the lens forming a pool. Inspect the pool to see that there are no bubbles or unwanted dirt or other foreign object. Bubbles can be burst with a pin and can be avoided by holding the nozzle of the adhesive container 2 mm. above the lens surface while forming the pool.

Step #8. Gently place the convex or anterior surface of the single vision lens atop the adhesive pool with the three layout dots super-imposed over the 180° meridian of the −0.50 D. cover lens. The adhesive will take a minute or two to spread out to the edges of the lens. This will happen automatically and without help because of the described curve compatability between the two lenses.

Step #9. After the adhesive has reached the lens edges everywhere, the lenses can be re-aligned. No sticking takes place until the sandwich is placed under ultra-violet light. Once properly aligned the sandwich can be lifted for inspection. If there is no dirt or bubbles, it is placed under ultra-violet light for curing. The cycle times are described earlier. If the sandwich is not clean, the two lenses can be separated by sliding one across the face of the other. They can then be re-assembled using the same steps listed above.

Step #10. After full cure, the finished lens assembly is identical to any standard surfaced lens with respect to edging, tinting, drilling, grooving and frame assembly.

Figure 1:
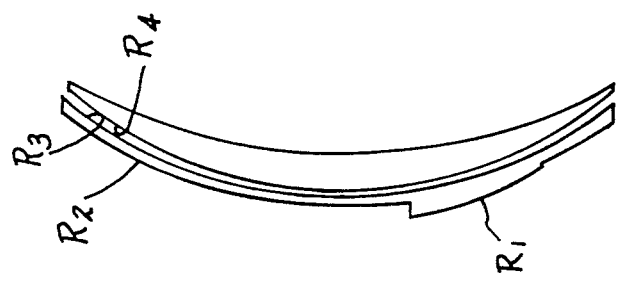
FIG. 1 is a cross-sectional view of a exemplificative eyeglass lens combination of the present invention.

The foregoing lens is shown in FIG. 1. $R_1$ is the raised portion of the anterior surface of the cover lens. It represents a flat top bifocal having a diopter value of +2.00 D. with an anterior curvature of +10.34 D. $R_1 = 51.257$ mm. $R_2$ is the anterior surface of the cover lens having a diopter value of +8.22 D. $R_2 = 64.476$ mm. $R_3$ is the posterior surface of the cover lens having a diopter value of −8.75 D. $R_3 = 60.57$ mm. The combination of $R_2$ and $R_3$ gives the cover lens a power of −0.50 D. Assuming a center thickness of 1.0 mm. the edge thickness at 75 mm will be approximately 1.7 mm when made from CR-39 plastic. Changes in thickness will occur with variations in center thickness lens material and diameter, but the ratio of 1.5 to 2 times more edge thickness than center thickness gives the thin veneer cover the needed stability. $R_4$ is the anterior surface of the single vision prescription lens having a diopter value of +8.82 D. $R_4 = 60.09$ mm. The significance of $R_4$ is that it is a 0.7 D. steeper than $R_3$ creating a minus lens configuration in the adhesive layer allowing the adhesive to flow uniformly out to the edge from a centrally dropped pool. This is essential to produce an inert optical contribution during the lamination process. The optical power of the cover lens combined with the optical power of the base lens equals the optical power of the combined sandwich only when the adhesive layer has a slight minus configuration.

The posterior portion of the single vision lens has a toric surface with the correction for astigmatism when needed. Naturally, the present invention can readily be used when only corrections for far-sightedness or near-sightedness are required.

EXAMPLE 2

Rx = −3.00 + 1.75 × 70

Add +2.50 Progressive Bifocal

Step #1. Transpose the distance prescription to minus cylinder form, i.e. −1.25 − 1.75 × 160

Step #2. Add +0.50 D. to the spherical power of the Rx to compensate for the effect of the −0.50 D. cover lens, i.e. −0.75 − 1.75 × 160

Step #3. Select a −0.75 − 1.75 single vision lens from stock and repeat the steps in Example 1.

In the present example, a progressive powered reading area is furnished on the anterior surface of a separate stock of −0.50 D. cover lenses. In a like manner, all the different multi-focal segment shapes and combinations will be available on the front of −0.50 D. cover lenses.

Figure 2:
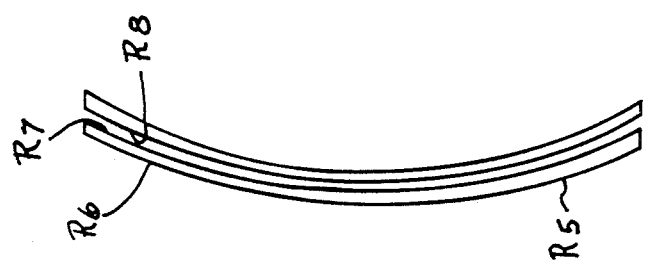

The foregoing lens is shown in FIG. 2. $R_5$ is the anterior curvature of the bifocal segment on the front of the cover lens having a variety of diopter curvature values in accordance with the state of the art standard procedures for manufacturing a progressive bifocal addition. The radius becomes shorter as the progressive area increases in power toward the bottom of the lens. $R_6$ is the anterior surface of the cover lens having a diopter value of +5.72 D. $R_6$ = 92.65 mm $R_7$ is the posterior surface of the cover lens having a diopter value of −6.25 D. $R_7$ = 84.8 mm. This gives the cover lens a power of −0.50 D. and a bifocal add of +2.50 D. $R_8$ is the anterior surface of the prescriptive single vision lens having a diopter value of +6.32 D. $R_8$ = 83.86 mm.

EXAMPLE 3.

Rx = +0.75 − 1.00 × 80

Single vision lenses with abrasion resistant and/or anti-reflection coating.

Step #1. The Rx is already in minus cylinder form. No further transposition is needed.

Step #2. Add +0.50 D. to the spherical power of the prescription to compensate for the effect of the −0.50 D. cover lens, i.e. +1.25 − 1.00 × 80

Step #3. Select a +1.25 − 1.00 single vision lens from stock and repeat the steps in Example 1. The −0.50 D. cover lens in this case would also be a single vision lens, but would have either an abrasion resistant as anti-reflection coating on the anterior surface.

The foregoing lens is shown in FIG. 3. $R_9$ is the anterior surface of the cover lens having a diopter value of +5.72 D. This is the surface having an abrasion resistance or anti-reflection coating. $R_9$ = 92.657 mm. $R_{10}$ is the posterior surface of the cover lens having a diopter value of −6.25 D. $R_{10}$ = 84.8 mm. This gives the cover lens a total power of −0.50 D. $R_{11}$ is the anterior surface of the single vision prescriptive lens having a diopter value of +6.32 D. $R_{11}$ = 83.86 mm. $R_{12}$ is the posterior surface of the prescriptive lens having a diopter value of −4.99/ −6.05 D. $R_{12}$ combined radii are: 106.21/87.603 mm. for the toric surface.

A significant feature of the combination of the present invention is that the curved anterior surface of the first lens is steeper than the curved posterior surface of the cover lens, preferably from 0.07 to 0.12 D. steeper. This creates a minus adhesive layer between the two lenses which would allow the adhesives to flow easily out to the lenses edges. In addition, this gives the layer of adhesive a slightly thicker lens at the edge than the center thickness encouraging the liquid adhesive to run evenly out the edge of the lens from a centrally dropped pool without help of any kind from the technician. This simplifies prescriptions of the eyeglass lens of the combination of the present invention and avoids wavy optics.

In accordance with the present invention it is contemplated that the cover lenses will be manufactured, packaged and shipped, unpacked, cleaned by the laminating technician, marked for assembly, assembled together with the single vision lens, and often stored under a wide variety of changing temperature and humidity conditions.

It has been found that a plano powered cover lens is not reliable. For example, when the posterior and anterior curves are nearly parallel as must be in all plano powered lenses, and the center thickness is close to 1 mm, wavy optics result from warpage caused by humidity, temperature and handling. Also, application of the adhesives and the adhesive layer itself presents more of a problem. The adhesive will not spread evenly.

It has been found in accordance with the present invention that the powered cover lens, and especially when the covered lens has a distance power of about −0.50 D., these problems are eliminated. This gives the edge of the cover lens about 1.5 to two times the thickness of the center in a 75 mm diameter lens making the cover practical to pick-up, position and manage throughout the process of handling and lamination. In addition, the plus powered employments of the present invention are also advantageous to work with and avoid problems of plano powered cover lenses. Further, the cover lens of the present invention includes less unwanted magnification which manifests itself as distortion to the wearer. This is especially important with positive powered lenses.

Thus, the eyeglass lens combination of the present invention creates a modular inventory of lens components which can be assembled using a simple laminating technique and which can provide patients with a "while you wait" service when desired. The eyeglass lens combination of the present invention avoids the power, thickness, and optical center location errors and variations commonly encountered in lenses surfaced by grinding labs. In addition, the present invention provides consistent quality by using factory-cast components and provides prescription eyeglasses of all types with abrasion resistant coatings having the consistency of quality only available from factory cast lenses. Anti-reflection coatings may be applied conveniently and easily without lengthy delays and breakage created by sending them to special coating houses. A wide variety of features may be readily obtained, including polarized lenses, asphericity, bi-focals, progressives, tri-focals and the like on a "while you wait" basis. Further the present invention enables a wide variety of prescriptions to be obtained on a cost effective basis without time consuming extra procedures.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A finished eyeglass lens which can be assembled simply, conveniently, and expeditiously without grinding to order and which comprises:
    a first preselected inner single vision prescription lens component with a selected diopter correction having a curved anterior surface and a curved posterior surface;
    a second preselected non-plano powered outer lens component having a range of diopter values from $-0.025$ to $-2.0$ and from $+0.50$ to $+2.0$ D and having a curved anterior surface and a curved posterior surface;
    said curved anterior surface of said first lens component being steeper than said curved posterior surface of said second lens component; and
    a substantially optically inert adhesive layer having a slight minus configuration optically and physically bonding together the anterior surface of the first lens component and the posterior surface of the second lens component so that the optical power of the lens is substantially equal to the optical power of the first lens component plus the optical power of the second lens component, said adhesive layer being thicker at its edges than at its middle region; whereby upon preselecting the first and second lens components the two can be optically and physically joined from a modular supply of both types of lenses so as to form said finished lens.

2. An eyeglass lens according to claim 1 wherein the curved anterior surface of the first lens component is $+0.07$ to $+0.12$ diopters steeper than the curved posterior surface of the second lens component so as to allow said adhesive to flow substantially evenly out to said edges and form said adhesive layer.

3. An eyeglass lens according to claim 1 wherein the thickness of the edge and center of the second lens component differ by a figure of at least 1.5.

4. An eyeglass lens combination according to claim 1 wherein the second lens component has a diopter value of about $-0.50$.

5. An eyeglass lens combination according to claim 1 wherein the second lens component includes a bi-focal or multi-focal lens in a position of its area.

6. An eyeglass lens combination according to claim 1 wherein the second lens component includes a supplemental feature on at least a portion of its surface.

7. An eyeglass lens combination according to claim 1 wherein the second lens component includes an anti-reflection coating.

* * * * *

UNITED STATES PATENT AND TRADEMARK OFFICE
CERTIFICATE OF CORRECTION

PATENT NO. : 4,867,553

DATED : September 19, 1989

INVENTOR(S) : PHILIP M. FRIEDER

It is certified that error appears in the above-identified patent and that said Letters Patent is hereby corrected as shown below:

In column 7, claim 1, line 10, change "-0.025" to -- -0.25 --.

Signed and Sealed this

Eleventh Day of December, 1990

Attest:

HARRY F. MANBECK, JR.

*Attesting Officer*      *Commissioner of Patents and Trademarks*